United States Patent
Harrison et al.

(10) Patent No.: US 11,270,005 B2
(45) Date of Patent: Mar. 8, 2022

(54) DEVICE DATA PROTECTION BASED ON NETWORK TOPOLOGY

(71) Applicant: Schneider Electric USA, Inc., Boston, MA (US)

(72) Inventors: Gregory Harrison, Holly Springs, NC (US); Amy Gau, Apex, NC (US); Matthew Furnari, Raleigh, NC (US); John Charles Foust, Zebulon, NC (US); Daniel Martin, Apex, NC (US); Ronald Mazyck, Garner, NC (US)

(73) Assignee: Schneider Electric USA, Inc., Boston, MA (US)

( * ) Notice: Subject to any disclaimer, the term of this patent is extended or adjusted under 35 U.S.C. 154(b) by 147 days.

(21) Appl. No.: 16/430,663

(22) Filed: Jun. 4, 2019

(65) Prior Publication Data

US 2020/0387614 A1 Dec. 10, 2020

(51) Int. Cl.
*H04L 29/06* (2006.01)
*G06F 21/60* (2013.01)
*H04L 9/32* (2006.01)
*H04L 9/08* (2006.01)
*G06F 21/57* (2013.01)
(Continued)

(52) U.S. Cl.
CPC ........ *G06F 21/602* (2013.01); *G06F 11/3072* (2013.01); *G06F 21/575* (2013.01); *H04L 9/0866* (2013.01); *H04L 9/3242* (2013.01); *H04L 45/02* (2013.01)

(58) Field of Classification Search
CPC ... H04L 9/0866; H04L 9/3242; G06F 21/602; G06F 21/575
USPC .......................................................... 713/189
See application file for complete search history.

(56) References Cited

U.S. PATENT DOCUMENTS

| 8,667,265 | B1 | 3/2014 | Hamlet et al. |
| 9,798,677 | B2 | 10/2017 | Thom et al. |
| 10,237,061 | B2 * | 3/2019 | Gazit .................... H04L 9/0866 |

(Continued)

OTHER PUBLICATIONS

International Search Report and Written Opinion of the International Searching Authority dated Aug. 12, 2020 corresponding to International Application No. PCT/US20/34838, 8 pages.

*Primary Examiner* — Longbit Chai
(74) *Attorney, Agent, or Firm* — Locke Lord LLP

(57) ABSTRACT

Embodiments of the disclosure provide for a fast device installation and replacement (DI&R) service in a network while simultaneously providing confidentiality and integrity protection for sensitive device data. In one embodiment, this protection is provided by using certain characterization data associated with each device in a network to generate a passphrase. This passphrase can be related to the topology of the devices. In one embodiment, the passphrase is a concatenation of certain device characterization data with respect to the topology. In embodiments, the concatenation includes arranging the characterization data based on an order of each device with respect to the topology. Cryptographic keys are derived based on the passphrase. The cryptographic keys are used to automatically encrypt and decrypt the sensitive device data without user intervention. In one embodiment, the cryptographic keys are used to automatically decrypt the sensitive device data to configure a replacement device for the network.

17 Claims, 14 Drawing Sheets

(51) Int. Cl.
*G06F 11/30* (2006.01)
*H04L 45/02* (2022.01)

(56) References Cited

U.S. PATENT DOCUMENTS

| | | | |
|---|---|---|---|
| 2009/0091442 A1* | 4/2009 | Howarth | G06Q 10/08 340/539.11 |
| 2013/0036311 A1* | 2/2013 | Akyol | H04L 9/3247 713/189 |
| 2016/0080502 A1 | 3/2016 | Yadav et al. | |

* cited by examiner

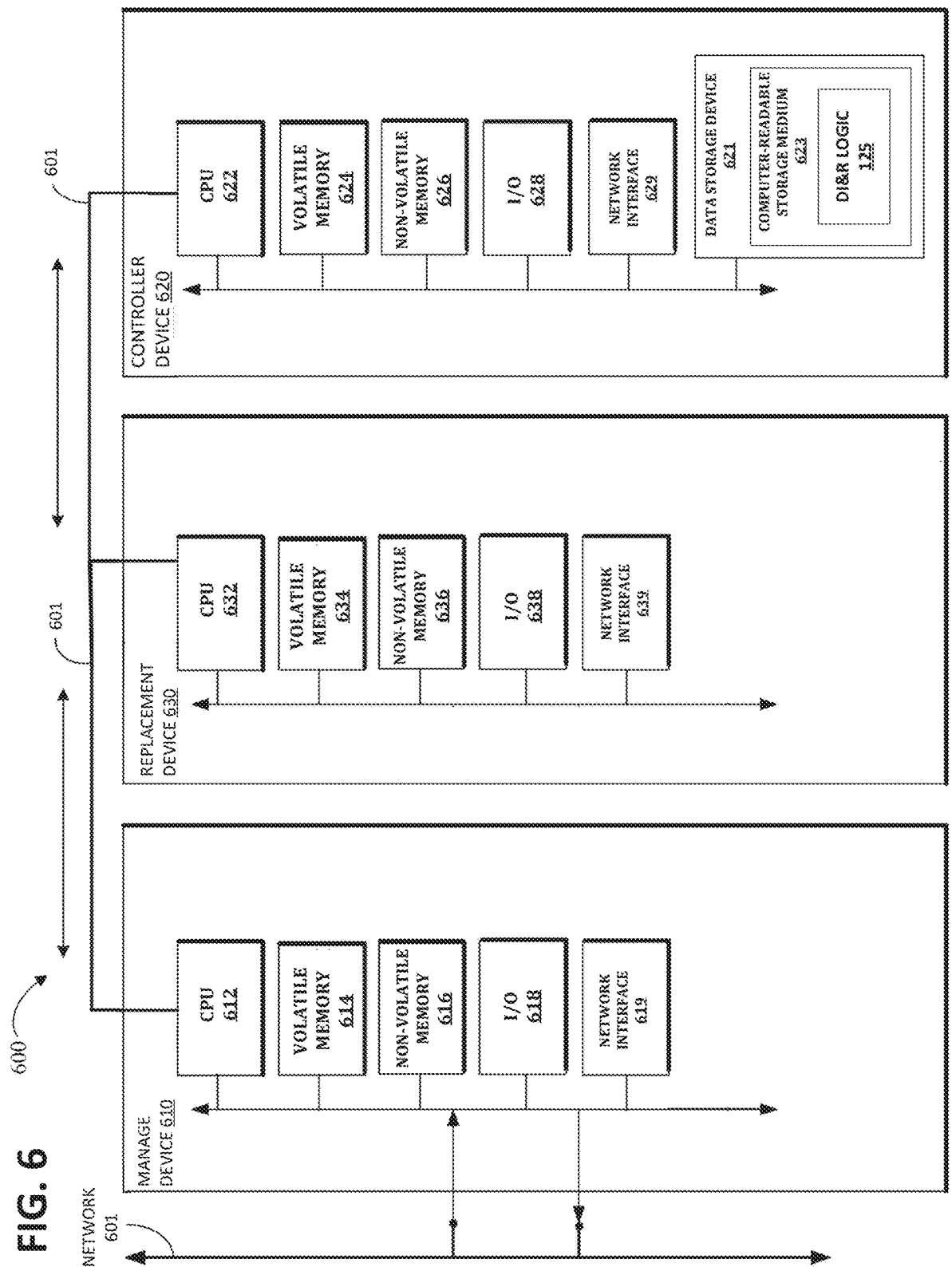

DEVICE DATA PROTECTION BASED ON NETWORK TOPOLOGY

TECHNICAL FIELD

The disclosure relates to protecting sensitive data of a device in network systems, and more particularly, to device data protection based on network topology.

BACKGROUND

There are many industries that have evolved to integrate complex industrial processes with networked systems. The networked systems can include, for example, distributed computerized control devices that control various aspects of the complex industrial processes used in the industries. In these types of systems, many of the computerized control devices can be replaced with a replacement device. For example, the replacement device can be physically installed and configured to operate in the same manner as an original device being replaced. In such cases, the system can be shut down for some period of time while the original device is physically removed from its location. During the installation of the replacement device, certain sensitive device data is accessed to configure the replacement device for the network. For example, after the replacement device is installed and connected to the network, operating parameters and configuration data can be downloaded to the replacement device via a network connection. In many cases, however, this can leave the sensitive device data unprotected or otherwise exposed to attack.

SUMMARY

In accordance with the disclosure, a fast device installation and replacement (DI&R) service that provides data confidentiality and strong integrity protection of sensitive device data without the need for user interaction is implemented by using certain device characterization data to generate a passphrase. In many implementations, the passphrase is based on a topology associated with interconnected devices of a network. For example, the passphrase can be a concatenation of device characterization data that is organized in a certain arrangement with respect to the topology. Then, cryptographic keys are derived based on this passphrase and are used to protect (e.g., encrypt/decrypt/hash) the sensitive device data without user intervention. During a later fast device replacement event, the characterization data of the devices is used to re-derive the cryptographic keys. In some implementations, encrypted sensitive device data to configure a replacement device is accessed and tested for validity. Then, the validated sensitive device data is decrypted and loaded into the replacement device that will resume normal operations of an original device in the network. In this manner, fast device replacement is achieved that provides data confidentiality while also maintaining the ease of device replacement without user interaction.

In one aspect, a controller device that provides device data protection based on network topology includes a memory to store a plurality of configuration data and a processing logic that is operatively coupled to the memory. The processing logic can identify a replacement device associated with at least one device of a plurality of devices in a network. Characterization data to characterize each of the plurality of devices and the replacement device is determined. Based on the characterization data, a passphrase related to a topology including the plurality of devices and the replacement device is generated. A key derivation function utilizing the passphrase as an input is executed to produce a cryptographic key. Using the cryptographic key, configuration data associated with a replacement of the at least one device with the replacement device is encrypted.

In another aspect, a method to provide device data protection based on network topology includes receiving characterization data characterizing each device of a plurality of devices in a network; deriving, by a controller device, a passphrase related to a topology of the plurality of devices based on the characterization data; producing, by the controller device, a cryptographic key based at least on the passphrase; and decrypting, using the cryptographic key, configuration data to configure a replacement device in the network.

In yet another aspect, a non-transitory computer-readable storage medium to provide device data protection based on network topology includes executable instructions that when executed, by a controller device, cause the controller device to: receive characterization data characterizing each device of a plurality of devices in a network. Based on the characterization data, a passphrase related to a topology of the plurality of devices is derived. A cryptographic key based at least on the passphrase is produced. Using the cryptographic key, configuration data is decrypted to configure a replacement device in the network.

In one example, the replacement device is configured to operate as a replacement of the controller device based on the configuration data when an event associated with the replacement is detected. In this example, the event includes, but not limited to, at least one of: a configuration change event, an operator command event, an error notification event, a reboot event or a scheduling event. To derive the passphrase, the characterization data for each of the plurality of devices associated with the topology is concatenated. To concatenate, the characterization data is arranged based on an order of each device of the plurality of devices with respect to the topology. In yet another example, decrypted configuration data for the replacement device is validated based on a computed hash value associated with the plurality of devices. To validate, the computed hash value is compared with a hash value extracted from the decrypted configuration data.

If the compared hash values do not match with each other, then an alert or error code is generated indicating that configuration of the replacement device cannot resume. If the compared hash values match, the decrypted sensitive device data is valid and the configuration of the replacement device can continue. Once the sensitive device data is decrypted and validated, the sensitive device data is loaded into the configuration of the replacement device. Thereupon, the replacement device can resume normal operations in substitution for the original device in the network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other features will be in part apparent and in part pointed out hereinafter.

BRIEF DESCRIPTION OF THE DRAWINGS

A more detailed description of the disclosure, briefly summarized above, can be had by reference to various embodiments, some of which are illustrated in the appended drawings. While the appended drawings illustrate select embodiments of this disclosure, these drawings are not to be considered limiting of its scope, for the disclosure can admit to other equally effective embodiments.

FIG. 6 is a block diagram illustrating a system including one or more machines in which embodiments of the disclosure can be used.

Identical reference numerals have been used, where possible, to designate identical elements that are common to the figures. However, elements disclosed in one embodiment can be beneficially utilized on other embodiments without specific recitation.

DETAILED DESCRIPTION

Aspects of the disclosure generally relates to implementing a fast device installation and replacement (DI&R) service in a network while simultaneously providing confidentiality and integrity protection for sensitive device (configuration) data, such as device configuration files, user/password identifiers, device firmware files, etc. The techniques of the disclosure provide this protection by using certain characterization data associated with each device in the network to generate a passphrase. This passphrase can be related, for example, to a topology associated with the devices. A topology refers to the physical design or arrangement/layout of interconnected devices of a network. For example, the passphrase can be a concatenation of the device characterization data that is organized in a certain arrangement with respect to the topology. Cryptographic keys are then derived based on this passphrase. The cryptographic keys are used to automatically encrypt and decrypt the sensitive device data without user intervention. For example, at least one of the cryptographic keys is used to automatically decrypt the sensitive device data to configure a replacement device for the network. Once decrypted, the sensitive device data can be loaded into the replacement device so that the device can operate as a replacement for an original device in the network. Thus, the techniques of the disclosure advantageously allow any device of the network to be rapidly and securely swapped out without adversely impacting service times or compromising system integrity.

Figure 1A:
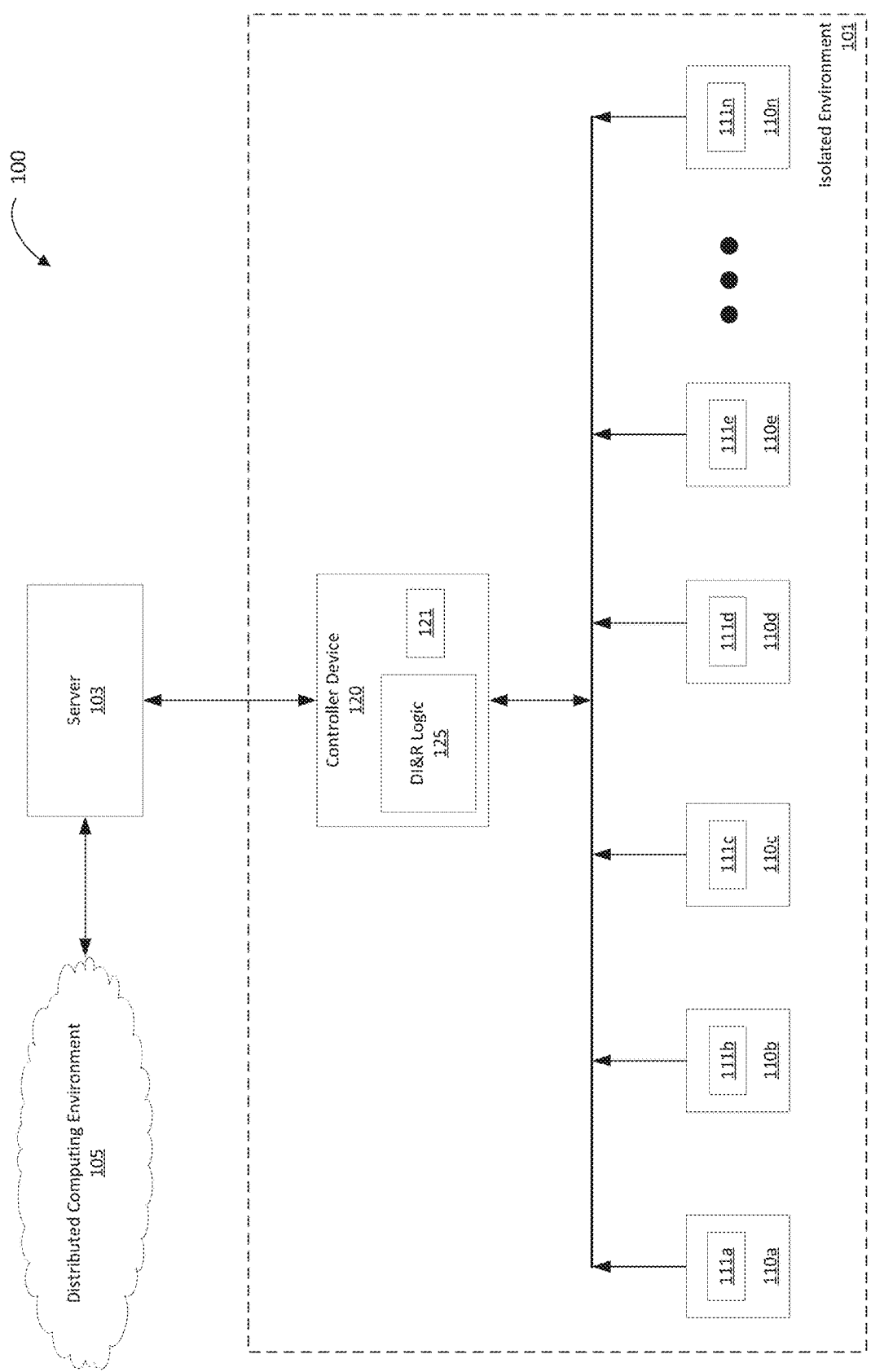
FIGS. 1A-1C are block diagrams illustrating a system architecture to provide device data protection based on network topology according to an embodiment of the disclosure.
Figure 1B:
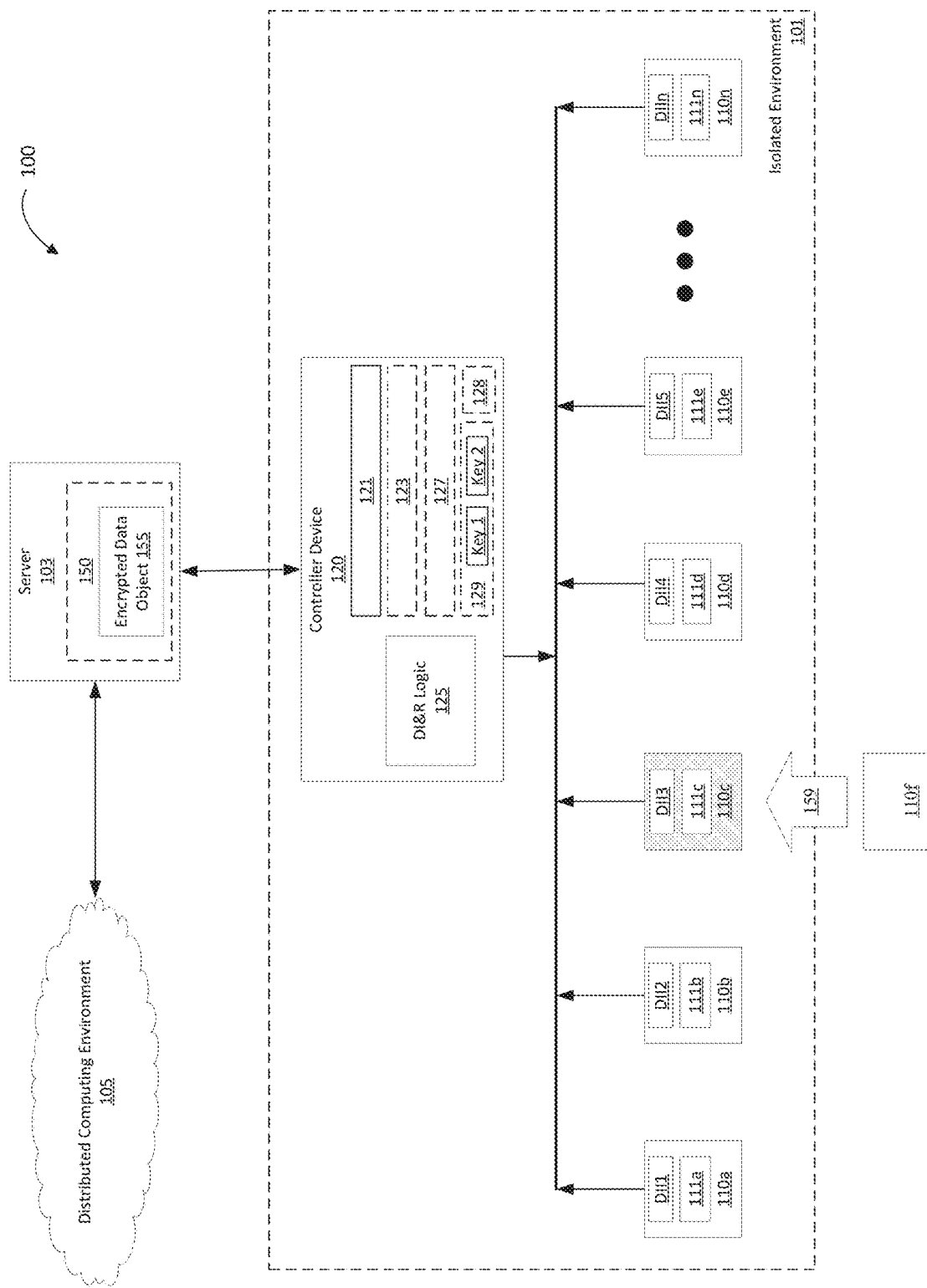
Figure 1C:
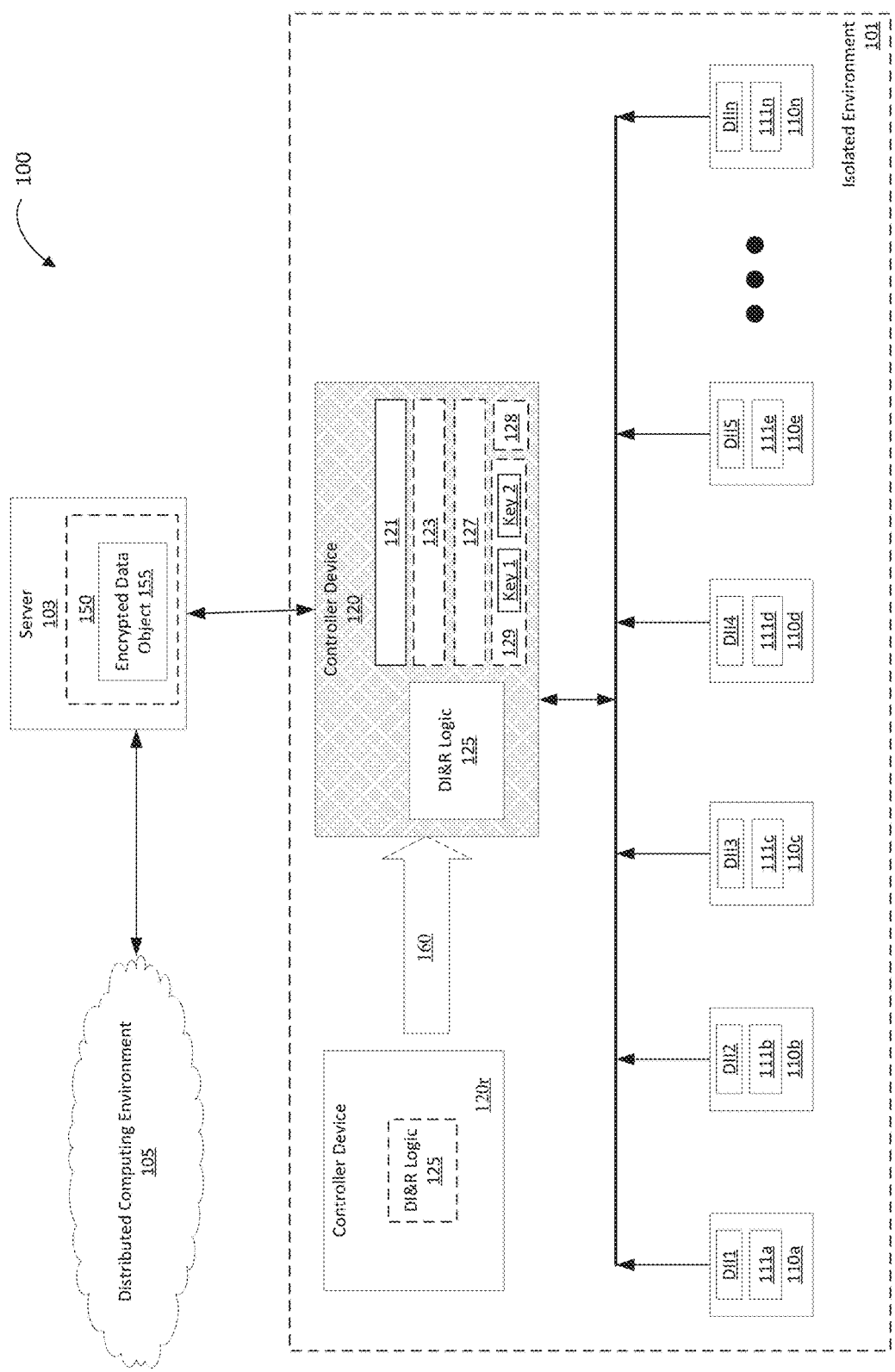

FIGS. 1A-1C are block diagrams illustrating a system architecture 100 to provide device data protection based on network topology according to an embodiment of the disclosure. As shown in FIG. 1A, the system architecture 100 includes an isolated environment 101 in communication (e.g., via a network connection) with one or more servers 103 associated with a distributed computing environment 105 coupled to the isolated environment 101. Aspects of the disclosure can be practiced in conjunction with a distributed computing environment 105 that includes many types of computer system configurations, including personal computers, hand-held devices, multi-processor systems, microprocessor-based or programmable consumer electronics, network PCs, minicomputers, mainframe computers, and the like. Aspects of the disclosure can also be practiced in conjunction with a distributed computing environment 105 where tasks are performed by local and remote processing devices that are linked (either by hardwired links, wireless links, or by a combination of hardwired or wireless links) through a communications network. In a distributed computing environment 105, program modules can be in both local and remote memory storage devices, such as server 103.

Server 103, in implementation, can be utilized as a storage device of the distributed computing environment 105. The server 103 can be a computer system a mainframe, a workstation, a personal computer (PC), a mobile phone, a palm-sized computing device, etc. The server 103 can run "host" software, such operating system to manage the hardware and other types of system resources that can include processors, memory, I/O devices to provide functions such as inter-process communication, scheduling, memory and data management, and so forth. In some implementations, the isolated environment 101 can also be referred to as a network, such as an industrial process control network. In some implementation, the isolated environment (network) 101 can include a public network (e.g., the Internet), a home or private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, the isolated environment 101 can include several interconnected devices, such as managed devices 110a-n that are managed by one or more controller devices, such as controller device 120. The interconnected devices can be implemented as part of a process control system for various industries (e.g., chemical processing, pulp and paper manufacture, power generation, oil and gas processing, telecommunications, a hospital campus, etc.). The controller device 120 can be a type of computer or processing device, which can receive and send commands and data to hardware devices (e.g., managed devices 110a-n) to control either a particular aspect of a process or the entire process as a whole. In one illustrative example, the controller device 120 can control aspects of an automation system to perform integrated energy generation and management of part or all of a facility. The managed devices 110a-n can receive commands from the controller device 120 to implement all of part of the controlled process. For example, the managed devices 110a-n can include a central processing unit which implements certain control functions as instructed by the controller device 120.

To maintain the operational health of the process control system of the isolated environment 101, anyone of the managed devices 110a-n or the controller device 120 can be installed and/or replaced. For example, an original device of the isolated environment 101 can be replaced with a replacement device based on a triggering event, such as when an operator command is received to pause or reboot the original device, when operation of the original device appears impaired or is failing, or when the original device is scheduled for replacement, etc. During the installation of the replacement device, certain sensitive device data 111a-n and 121 can be accessed to configure the replacement device for operation in the network. This sensitive device data 111a-n and 121 associated with each managed device 110a-n and 120 can include, but not limited to, configuration data/files including passwords/user ids and other types of sensitive device data. In some situations, accessing the sensitive device data can cause an issue because this can leave the data unprotected or otherwise exposed to attack, leading to various type of system failures or corruption that can adversely impact system performance.

Implementations of the disclosure address the above-mentioned and other deficiencies by implementing a fast device installation and replacement (DI&R) service that simultaneously provides secure data protection for sensitive device data based on the network topology. In some implementations, the techniques of the disclosure can be implemented in DI&R processing logic 125 (e.g., hardware/software) of controller device 120. For example, the DI&R processing logic 125 can be preloaded or loaded on demand in firmware of the device. In accordance with the disclosure, the DI&R processing logic 125 provides data confidentiality and strong integrity protection of the sensitive device data 111a-n and 121 by using certain device characterization data to generate a passphrase related to the topology of the devices 110a-n and 120.

Turning to FIG. 1B, another view of the system architecture is shown. In this example, the DI&R processing logic 125 initially instructs the controller device 120 to query all the managed devices 110a-n for device characterization data (device identification information) DII1-n. For example, the device characterization data DII1-n characterizes each device and can include, but not limited to, a device serial number, a device commercial reference number, device location information, device order sequencing information, etc. To query the managed devices 110a-n, the controller device 120 can use various techniques. For example, the controller device 120 can send a command or instruction to the managed devices 110a-n for each respective device to provide their device characterization data DII1-n. In response to the command, the devices 110a-n can return the device characterization data DII1-n for processing by the controller device 120. In an alternative implementation, the controller device 120 can query hardware storage of the managed devices 110a-n for information related to device characterization data DII1-n. In some implementations, the controller device 120 can store the device characterization data DII1-n in memory or other types of storage devices. The query for the device characterization data DII1-n can be implemented, for example, at an initial construction of the system architecture or later on-demand by the controller device 120.

Based on the device characterization data DII1-n, a passphrase (e.g., text data) 123 related to the topology of the managed devices 110a-n is generated. For example, the passphrase 123 can be a concatenation of a certain portion and/or combination of the device characterization data DII1-n of the devices. In some implementations, the concatenation includes arranging the device characterization data DII1-n based on an order of each device with respect to the topology. For example, the device characterization data DII1 and DII2 of managed devices 110a and 110b, respectively, can be used to generate the passphrase 123. In this example, DII1 can include the device serial number DII1=XXX while DII2=456, which may include the device commercial reference number. As such, the passphrase is generated as a test string="DII1|DII2| . . . |DIIn," (where '|' in this context denotes concatenation) or as an example "XXX|456 . . . ". In some instances, the order of the devices in the test string can be determined based on location information, device hierarchy, functionality, priority level or other types of device information. In alternative implementations, the concatenation of the device characterization data DII1-n can be unordered as well as other arrangements of this data are possible.

Cryptographic keys (e.g., Key 1 and Key 2) are then derived based on passphrase 123. For example, the passphrase is used as input data to a key derivation function 127. In some implementations, the key derivation function 127 can include various types of password hashing functions based on hashing algorithms, such as ARGON2, PBKDF2, SCRYPT, or BCRYPT. Based on the passphrase, the key derivation function 127 returns an output key 129. The output key 129 can be divided into two keys, Key1 and Key2, where Key1 is an encryption/decryption key (128 bit minimum length) and Key2 is the hash-based message authentication code (HMAC) key (128 bit minimum length). In some implementations, the output key length is 256 bits, which meets a minimum key length of 128 bits for Key 1 and a hash length of 128 bits for Key 2. In alternative implementations, the length of the output key 129 can be less than 256 bits, however, this may include a corresponding sacrifice in security.

The controller device 120 automatically encrypts and decrypts the sensitive device data 111a-n and 121 based on the cryptographic keys (Key 1 and Key 2) derived from the output key 129. For example, Key1 (encryption/decryption key) is used to encrypt the sensitive device data 111a-n and 121). Key 2 (hash key) is used an input to a cryptographic hash algorithm that also takes in the unencrypted sensitive device data 111a-n and 121 and returns a hash value 128. The hash value 128 represents, for example, a unique (e.g., 256-bit) signature for the text. The hash value 128 is later used to ensure that the sensitive device data 111a-n and 121 is not changed or tampered with after being encrypted.

Once the sensitive device data 111a-n and 121 is encrypted, an encrypted data object 155 that includes the encrypted sensitive device data 111a-n and 121 and hash value 128 is generated and archived for later retrieval. For example, the encrypted data object 155 can be stored in a datastore 150 of server 103. In some implementations, the encrypted data object 155 can be labeled with a unique label to associate it with the controller device 120. For example, a unique identifier (e.g., MAC address) of the controller device 120 can be used to create a unique label for the encrypted data object 155. This ensures that the controller device 120 accesses the correct encrypted data object 155. In some implementations, the address of one or more of the managed devices 110a-n along with the unique identifier of the controller device 120 can be used to create the unique label for the encrypted data object 155. In other implementations, the unique label may include date/time information for versioning control of the encrypted data object 155.

In some implementations, the cryptographic keys (Key 1 and Key 2) derived from the output key 129 are deleted, for example, to ensure that they are not improperly accessed or left unsecure. Since the keys are deleted, during a later fast device replacement event, the sensitive device data 111a-n and 121 of the managed devices 110a-n is used to re-derive the cryptographic keys (Key1 and Key 2). For example, if a replacement device 110f is tasked (as indicated by arrow 159) to replace a managed device (e.g., 101c) of the managed devices 110*a-n*, the replacement device 110*r* can be configured by the controller device 120 using sensitive device data. The controller device 120, for example, can store a copy of the sensitive device data 111*a-n* and 121 so that it can configure any replacement device to operate normally in the isolated environment 101.

Due to the change in the topology related to the insertion of the replacement device 110*f* in the isolated environment 101, the controller device 120 updates the encrypted data object 155 that is archived at server 102. For example, the DI&R processing logic 125 instructs the controller device 120 to again retrieve device characterization data DII1-n from all the managed devices 110*a-n* (which now also includes the replacement device 110*f*). Based on the device characterization data DII1-n, a new passphrase 123 associated with the topology is generated. A new cryptographic key 129 is derived based on that new passphrase 123. Thereupon, the sensitive device data 111*a-n* is encrypted and new hash values 128 are generated based on the Key 1 and Key 2 portions of the new cryptographic key 129. Once encrypted and sorted in an update encrypted data object 155, the encrypted data object 155 is labeled and again archived at the server 103.

In FIG. 1C, another view of the system architecture 100 is shown. In this example, a replacement device 120*r* is tasked (as indicated by arrow 160) to replace the controller device 120 in isolated environment 101. Here, the replacement device 120*r* is loaded with the DI&R processing logic 125. For example, the DI&R processing logic 125 can be preloaded or loaded on demand in firmware of the replacement device 120*r*. Since the topology of the managed devices 110*a-n* is not changed, the replacement device 120*r* can be configured with the sensitive device data of the encrypted data object 155 that was previously archived. For example, the encrypted data object 155 is retrieved from server 103, decrypted and applied to (e.g., hardware memory of) the replacement device 120*r*.

To decrypt the encrypted data object 155, the same cryptographic key 129 used to encrypt that data is recreated. In this regard, the DI&R processing logic 125 queries all the managed devices 110*a-n* in the isolated environment 101 for the same device characterization data DII1-n that was previously obtained. Based on this device characterization data device characterization data DII1-n, the previous passphrase 123 related the topology is regenerated. Key 1 and Key 2 of the cryptographic key 129 are derived based on the previous passphrase and are used to decrypt the sensitive device data of encrypted data object 155.

In some implementations, the sensitive device data of the encrypted data object 155 is tested for validity before it is loaded into a replacement device 120*r*. For example, the DI&R processing logic 125 can validate the sensitive device data based on hash values associated with the managed devices 110*a-n*. This ensures that the sensitive device data has not been changed or tampered with since it was encrypted. For example, after the cryptographic keys were generated, a hash value 128 for the sensitive device data for each managed device was also generated and stored along with the encrypted sensitive device data in the encrypted data object 155 for later retrieval.

To validate the sensitive device data of the encrypted data object 155, a previously stored hash value is extracted from the encrypted data object 155. The extracted hash value is compared to a computed hash value 128 that is recalculated based on the sensitive device data 111*a-n* associated with the managed devices 110*a-n*. For example, Key 2 of the recreated the cryptographic key 129 is fed into the cryptographic hash algorithm along with the unencrypted sensitive device data 111*a-n* and 121. The cryptographic hash algorithm then returns hash value 128.

If the compared hash values do not match with each other, then the controller device 120 generates an alert or error code indicating that configuration of the replacement device 120*r* cannot resume. If the compared hash values match, the decrypted sensitive device data is valid and the configuration of the replacement device 102*r* can continue. Once the sensitive device data is validated and decrypted, the DI&R processing logic 125 loads the sensitive device data into the configuration of the replacement device 120*r*. Thereupon, the replacement device 120*r* can resume normal operations in substitution for the original device (e.g. controller device 120) in the isolated environment 101.

Figure 2A:
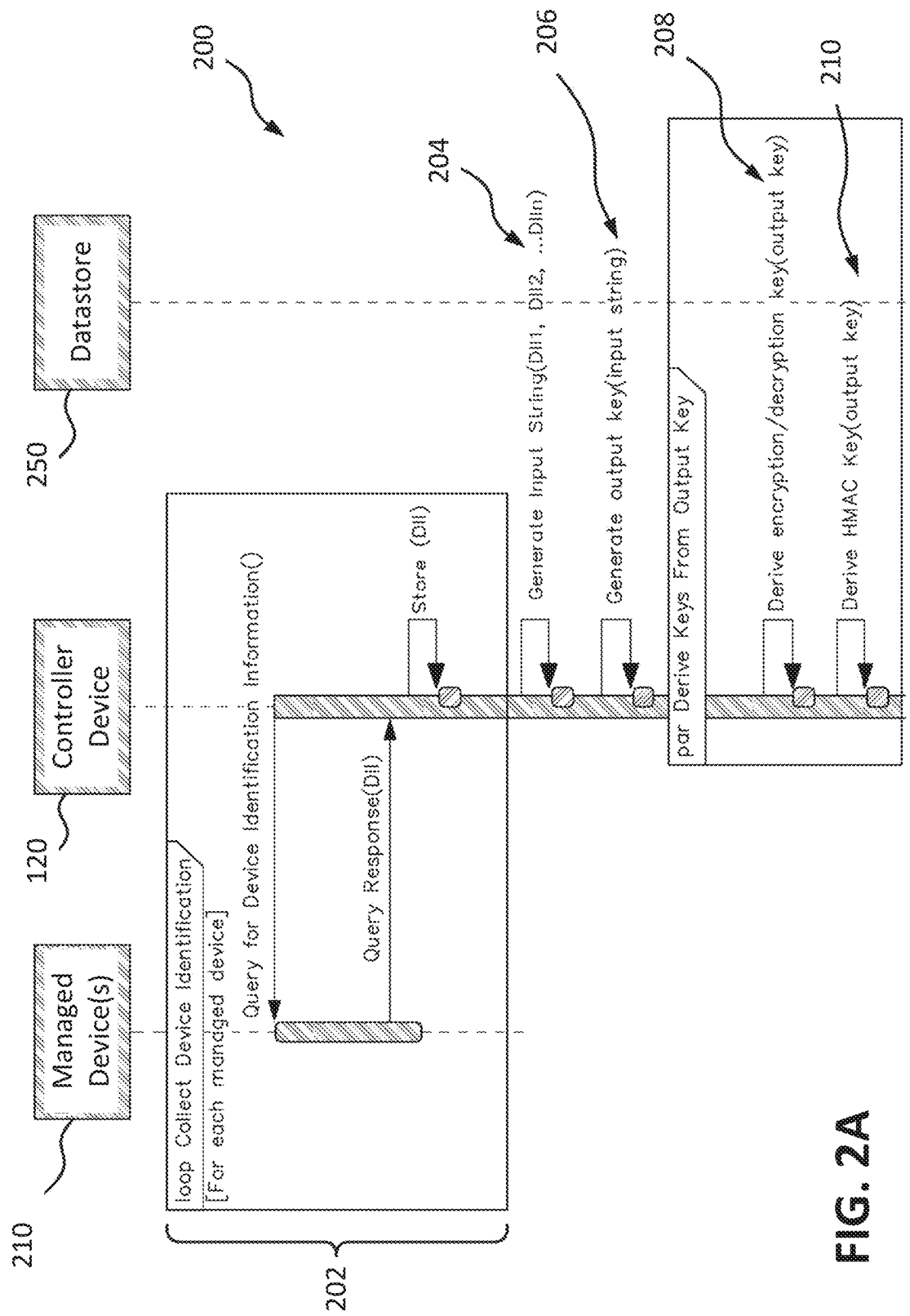
FIGS. 2A-2C are flow diagrams illustrating a background triggering process to provide device data protection based on network topology of all managed devices in a network according to an embodiment of the disclosure.
Figure 2B:
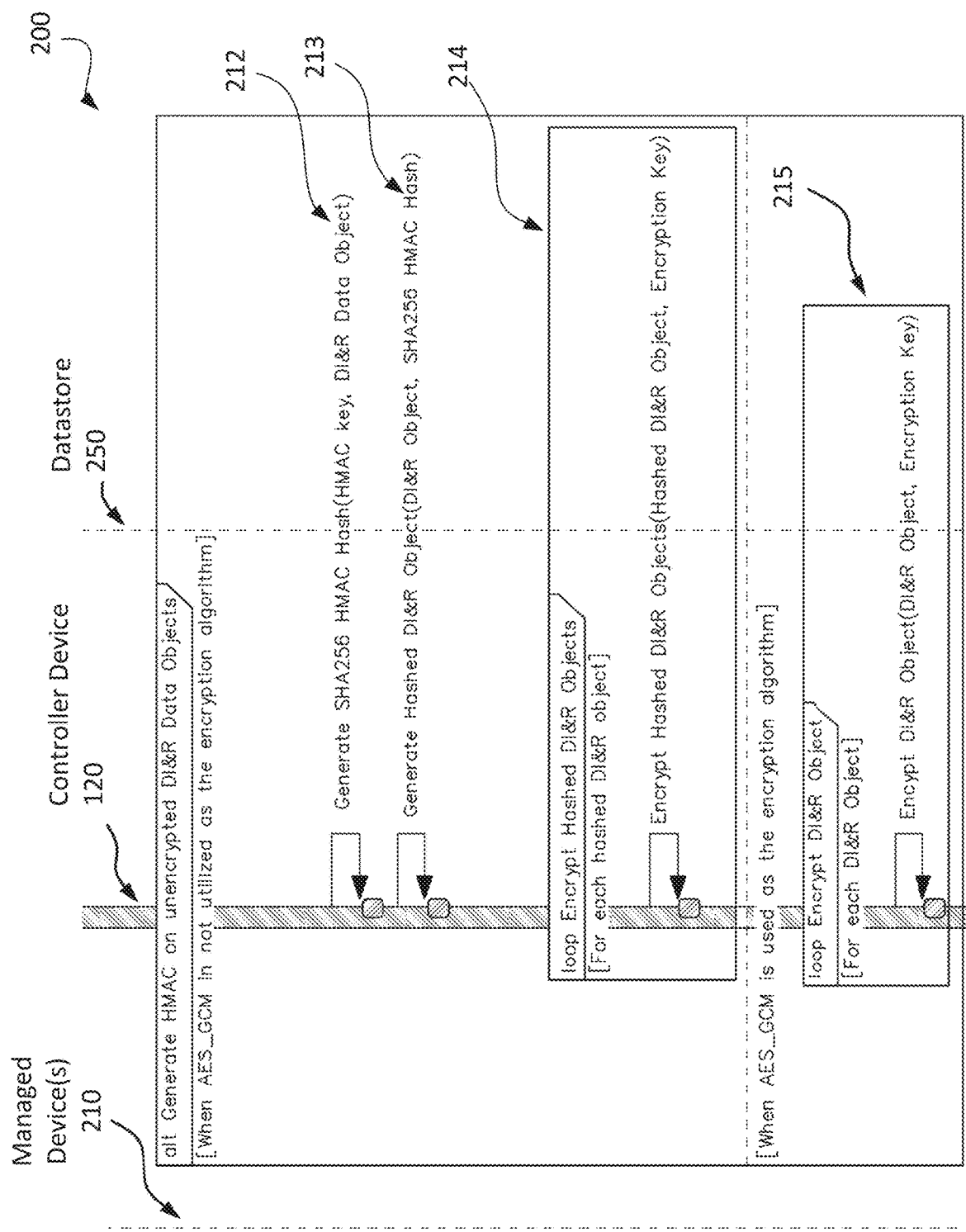
Figure 2C:
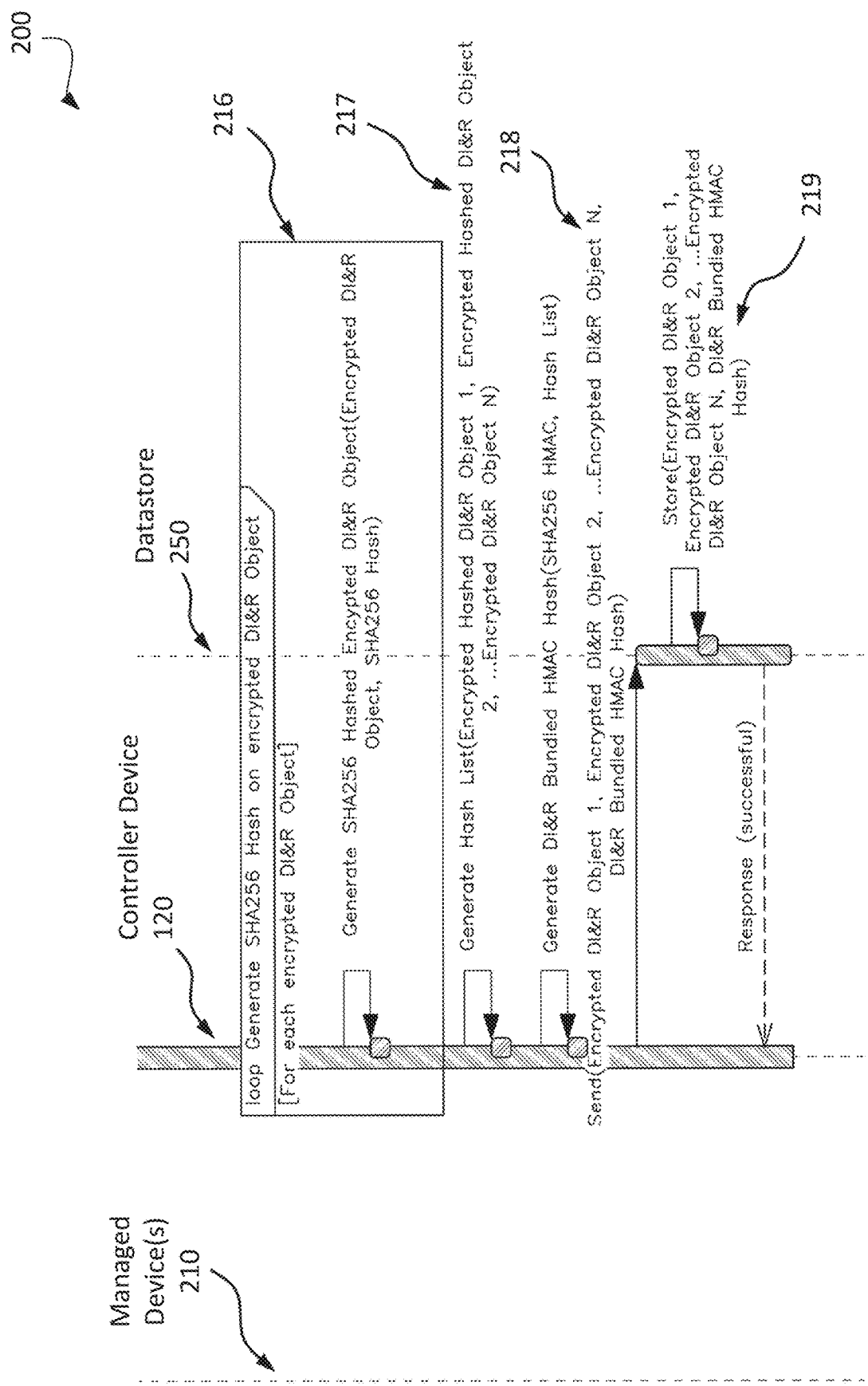

FIGS. 2A-2C are flow diagrams illustrating a background triggering process 200, for example, executed by the DI&R processing logic 125 of controller device 120, to provide device data protection based on network topology of all managed devices (e.g., managed devices 110*a-n*) in a network (e.g., isolated environment 101). The background triggering process 200 can be implemented in conjunction with the controller device 120, managed devices 210 (which can be the same as managed devices 110*a-n*) and a data store 250 (which can be the same as data store 150 of server 103). In some implementations, activation of the background triggering process 200 can causes a list of background processes to be implemented with data associated with a DI&R service. For example, the background triggering process 200 can be initially activated to provide protection for sensitive device data during a later fast device replacement event.

Turning to FIG. 2A, the background triggering process 200 begins at step 202 where the controller device 120 queries and receives device identification information (DII) associated the managed devices 210. For example, the device identification information characterizes each device and can include, but not limited to, a device serial number, a device commercial reference number, device location information, device order sequencing information, etc. To query the managed devices 210, the controller device 120 can execute a query command. For example, the controller device 120 can loop through each managed device to execute a query command or instruction is executed. In response to the query command, each managed device 110*a-n* can return a response that includes the device characterization data DII1-n, which is then stored by the controller device 120.

At step 204, an input string (also referred to as a passphrase) is generated based on the received DII. For example, the passphrase can be a concatenation of certain portions and/or combinations of the DII. In some implementations, the concatenation includes arranging the DII based on an order of each device with respect to the topology. In some instances, the order of the devices can be determined based on location information, device hierarchy, functionality, priority level or other types of device information. In alternative implementations, the concatenation of the DII can be unordered as well as other arrangements are possible.

At step 206, an output key (also referred to as a cryptographic key) is generated based on the input string. For example, the input string or passphrase is used as input to a key derivation function to derive one or more secret keys. The key derivation function, for example, can include various types of password hashing functions as further discussed below. The output key length is of a certain length (e.g., 256 bits) to meet a minimum key length for security. In alternative implementations, the length of the output key can be of other lengths, but this can cause a corresponding effect on security.

As shown in steps 208 and 210 in an optional path, the resulting output key or cryptographic key can, in some implementations, be divided into two keys. At step 208, an encryption/decryption key of a certain length (e.g., 128 bits) is extracted from a portion of the cryptographic key. At step 210, a hash key of a certain length (e.g., 128 bits) is extracted from another portion of the cryptographic key. Keys derived from the cryptographic key are used to automatically protect sensitive device data of the managed devices 210.

Turning to FIG. 2B, a continuation of the background triggering process 200 is shown. In this example, alternative techniques are shown that can be implemented to protect the sensitive device data (also referred to as a DI&R data object) associated with each of the managed devices. For example, in one implementation a hash-based message authentication code (HMAC) may be utilized while in an alternative implementation is not used. Rather, AES-GCM (Advanced Encryption Standard-Galois Counter Mode) is utilized as an encryption algorithm which makes the HMAC redundant.

In one alternative implementation, a hash-based message authentication code (HMAC) can be generated based on the unencrypted DI&R data object. A HMAC is a type of message authentication code that is generated based on a cryptographic key and a hash function. The HMAC is used to provide both data integrity and authentication of a message. In some implementations, various types of hashing functions, such as SHA-256 or SHA-3 can be used in the calculation of the HMAC. At step 212, a hash value is generated by using, for example, a SHA-256 hash function based on the sensitive device data and the hash key derived from the output key. As step 213, the sensitive device data is hashed based on the HMAC and hash value. At step 214, the hashed sensitive device data for each managed device is encrypted based on the encryption key derived from the output key.

If AES-GCM is utilized as an encryption algorithm, there is no need to generate a HMAC hash for the sensitive device data. This is because AES-GCM provides authenticated encryption and decryption, which makes the HMAC step redundant. Thus, in an alternative implementation at step 215, the sensitive device data is encrypted for each managed device based on the encryption key derived from the output key. For example, the original DI&R data objects are fed in the encryption algorithm, as AES_GCM provides authenticated encryption and authenticated decryption.

Turning to FIG. 2C, another continuation of the background triggering process 200 is shown. At step 216, the encrypted sensitive device data for each managed device is hashed based on, for example, a SHA-256 hashing function, and the hash key derived from the output key. Once the hashes are generated, the hashes are concatenated together into a hash list and the encrypted sensitive device data is bundled together into a single object at step 217. At step 218, the encrypted data objects and the hashed encrypted sensitive device data objects are transmitted to a remote or local server. At step 219, the sensitive device data is stored at the server for later retrieval.

FIGS. 3A-3E are flow diagrams illustrating a background triggering process 351, for example, executed by the DI&R processing logic 125 of controller device 120, to provide device data protection based on network topology when implementing a replacement device, such as controller device 120r in a network (e.g., isolated environment 101). As shown, the background triggering process 351 can be implemented in conjunction with the controller device 120, one or more managed devices 310 (which can be the same managed devices 110a-n) and a data store 350 (which can be the same as data store 150 of server 103). In some implementations, activation of the background triggering process 351 can causes a list of background processes to be implemented with data associated with a DI&R service. For example, the background triggering process 351 can be activated when a fast device replacement event, such as a configuration change event, an operator command event, an error notification event, a reboot event or a scheduling event, is detected.

Figure 3A:
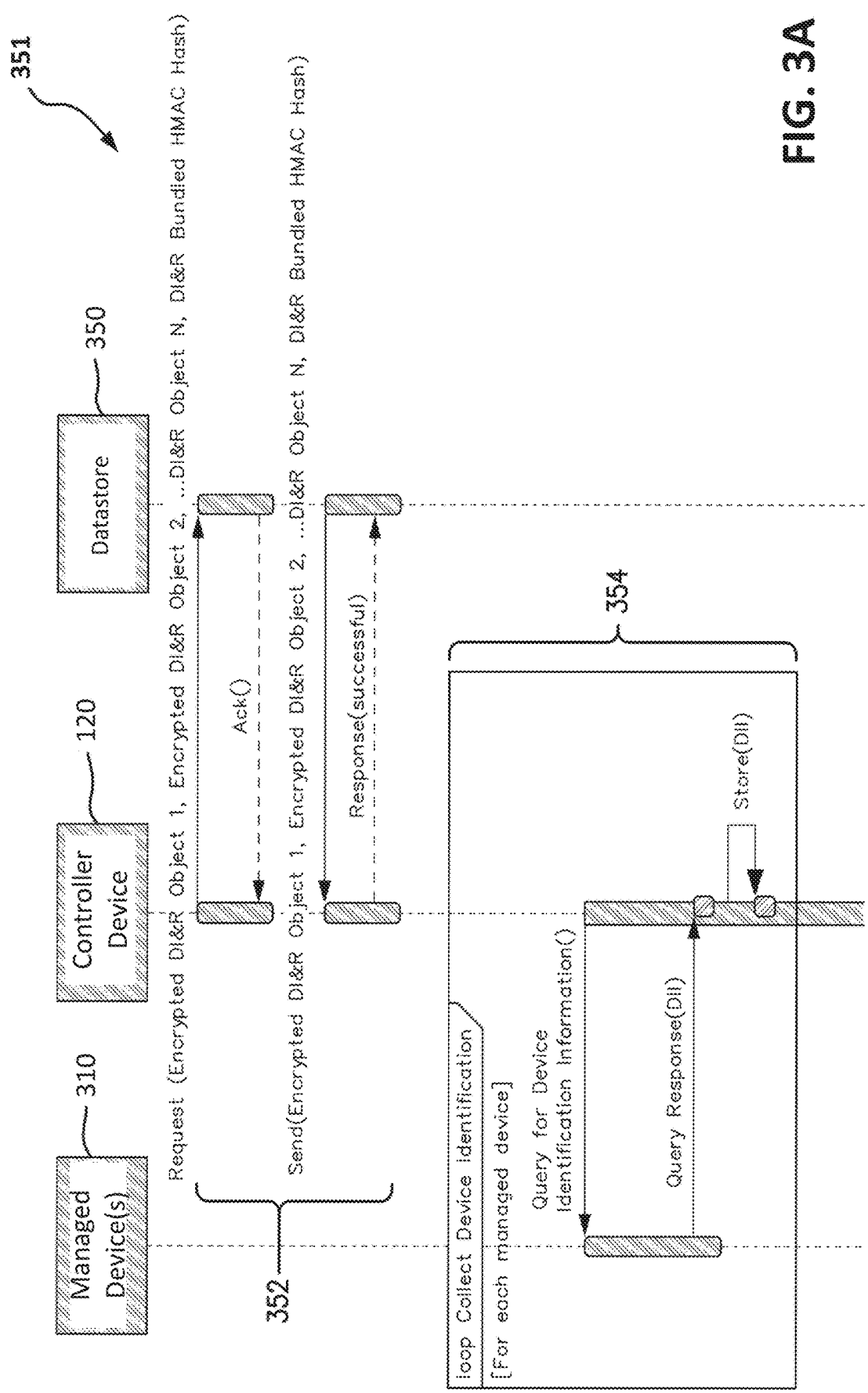
FIGS. 3A-3E are flow diagrams illustrating a background triggering process to provide device data protection based on network topology when replacing a device in a network according to an embodiment of the disclosure.

With respect to FIG. 3A, the background triggering process 351 begins at step 352 where the controller device 120 sends a request command to the data store 350 to receive the encrypted sensitive device data stored thereon. In response, the data store 350 can transmit or otherwise provide access to the encrypted sensitive device data. The controller device 120 then decrypts the encrypted sensitive device data. To decrypt the encrypted sensitive device data that is retrieved, the same cryptographic key used to encrypt that data is recreated. In that regard, the controller device 120 first at step 354 queries the managed device and receive the DII (device identification information) data that characterizes each of the managed device.

Figure 3B:
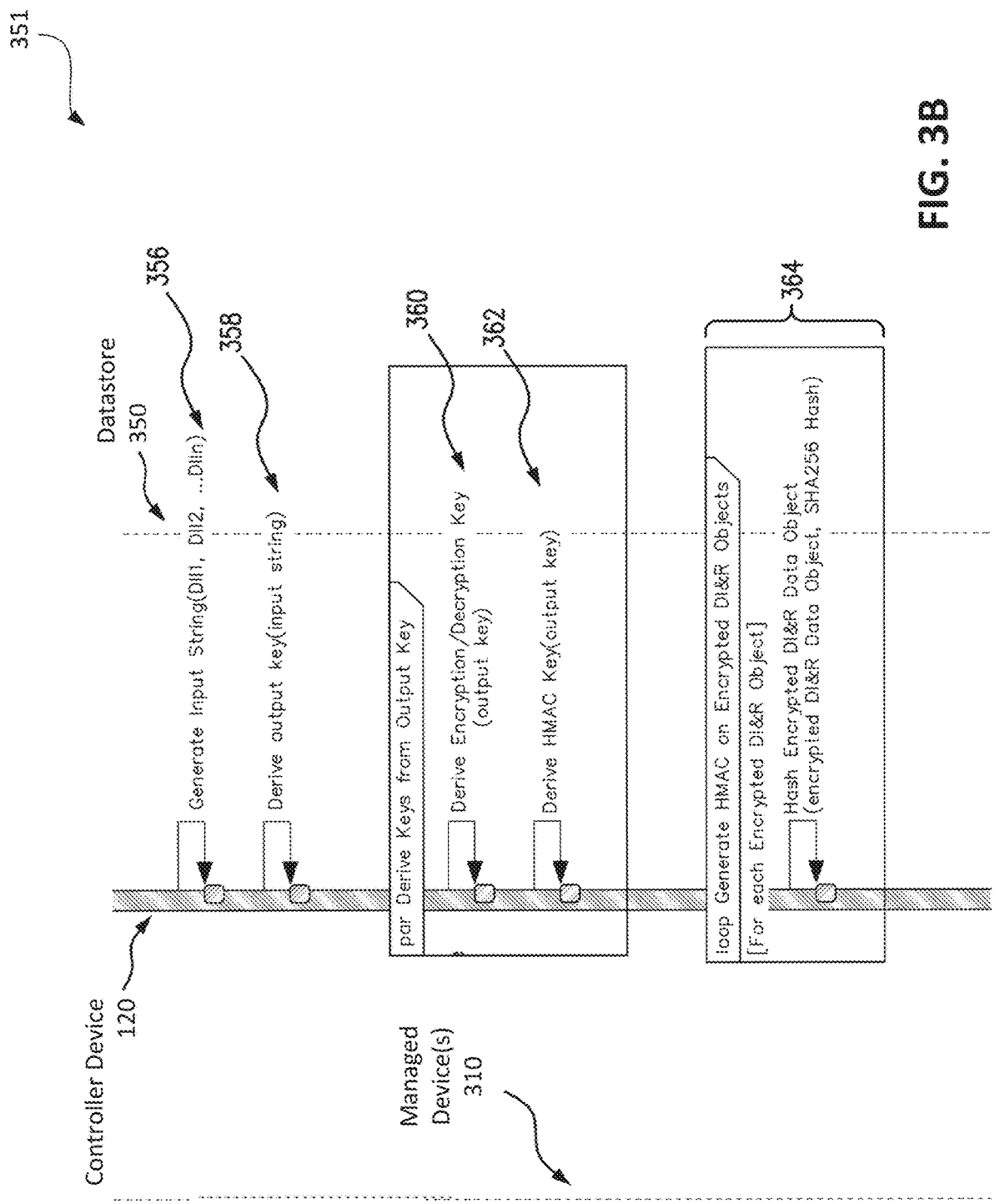

Turning to FIG. 3B, an input string (passphrase) is generated at step 356 based on the DII data. For example, the passphrase can be a concatenation of certain portions and/or combinations of the device characterization data DII for each of the managed devices. In some implementations, the concatenation includes arranging the DII data in view of an order of each device with respect to the topology. At step 358, an output key (cryptographic key) is generated based on the input string. For example, a key derivation function using a hashing algorithm, such as ARGON2, PBKDF2, SCRYPT, or BCRYPT, takes the input string as input and returns the output key. Then, the output key is divided into at least two keys. For example, the output key is divided into an encryption/decryption key at step 360 and a hash key at step 362. At step 364, the sensitive device data for each managed device is hashed based on the hash key.

Figure 3C:
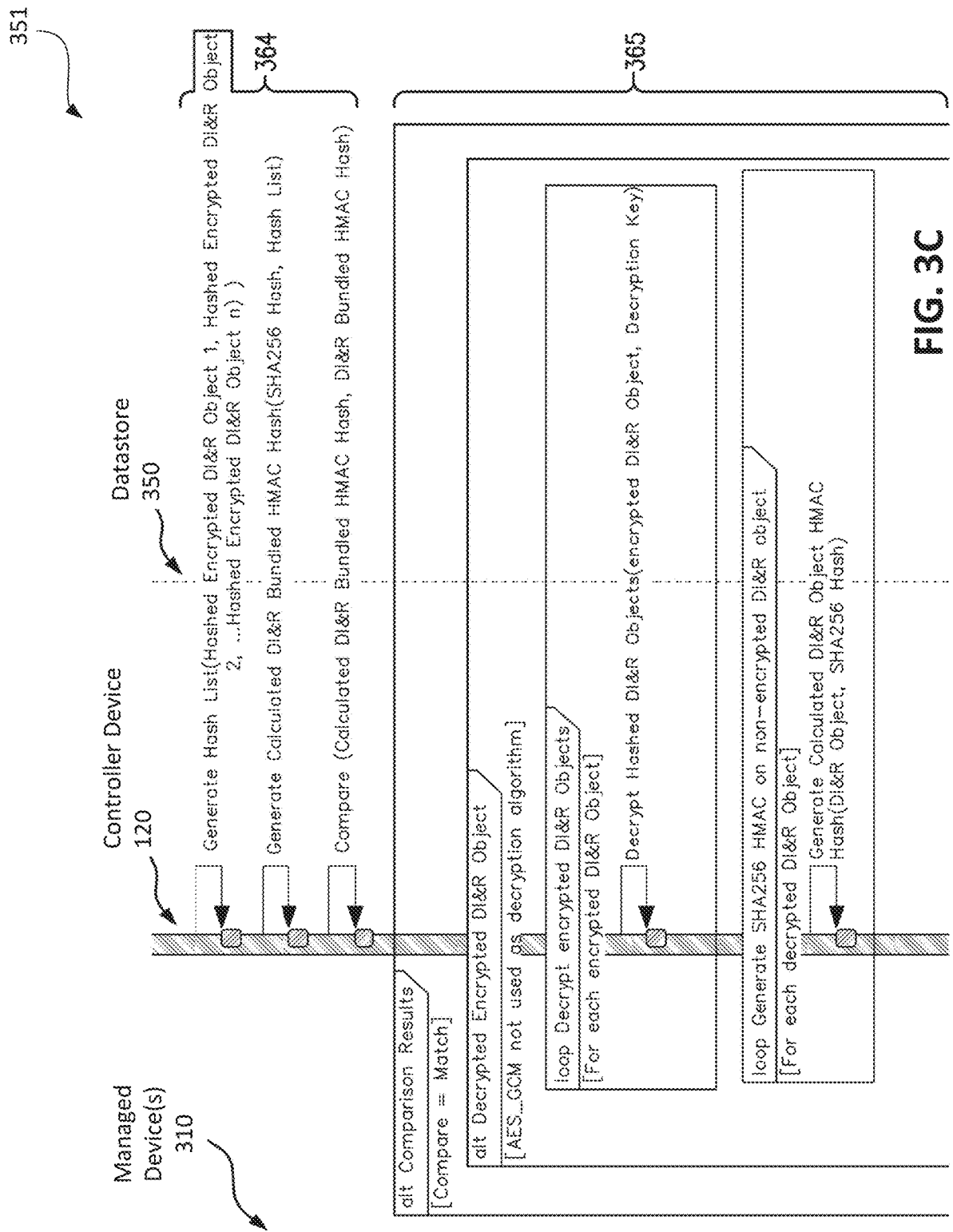

In FIG. 3C, the background triggering process 351 continues where the hashes for each of the encrypted sensitive device data are concatenated together into a hash list and then validated. To validate the encrypted sensitive device data, a previously stored hash value is extracted from the encrypted sensitive device data. The extracted hash value is compared to a computed hash value that is recalculated based on the sensitive device data associated with the managed devices. An advantage of the validating steps is that it ensures that the sensitive device data has not been changed or tampered with since it was encrypted.

At 365, each encrypted sensitive device data object is decrypted and a hash value is computed. At step 366, a corresponding hash value is extracted from the previously hashed sensitive device data. Thereupon, the computed hash value is compared to the extracted hash value for each managed device. If the compared hash values do not match with each other, then the background triggering process 351 continues on a "failure" path. If the compared hash values match, the background triggering process 351 continues on a "success" path.

Figure 3D:
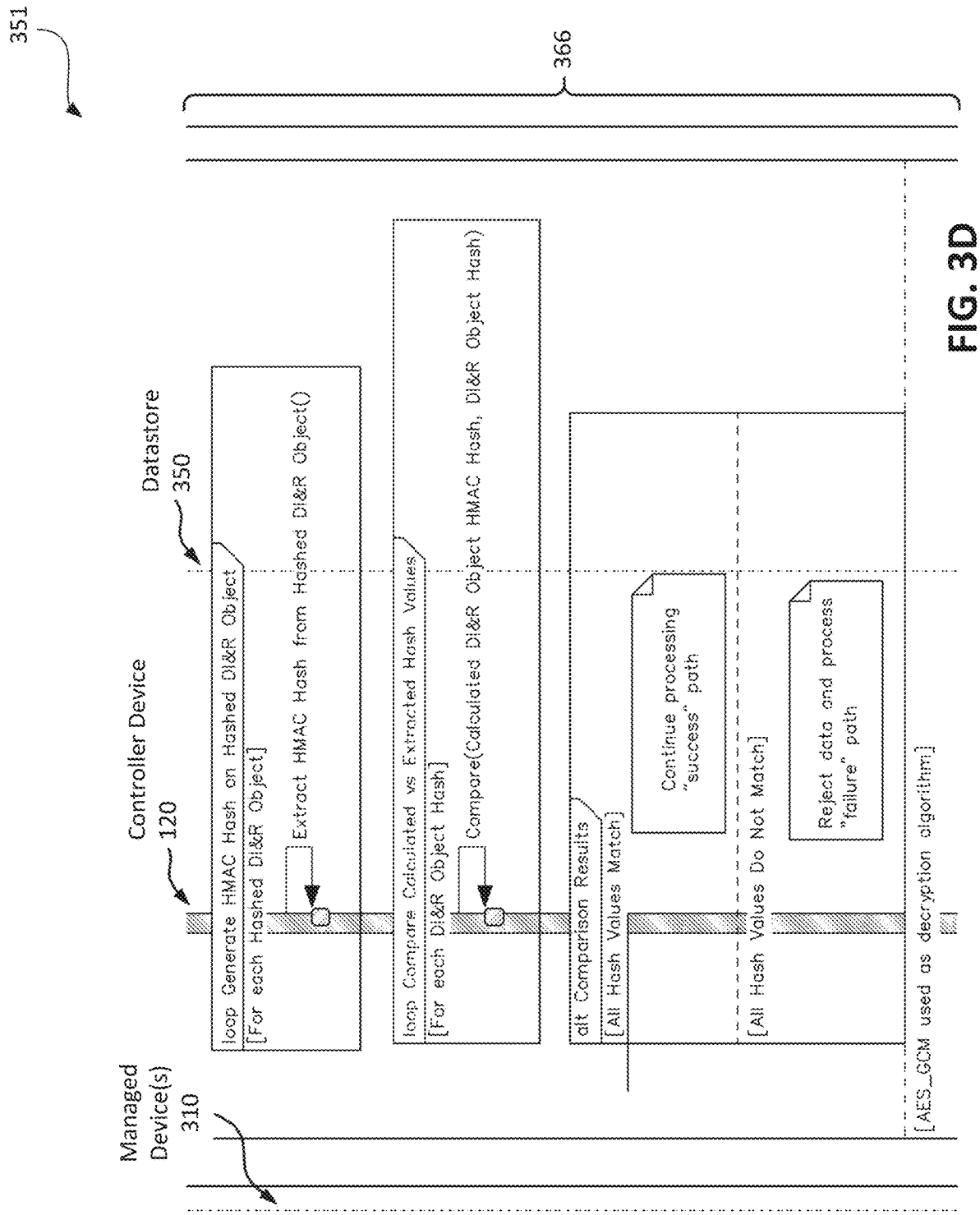
Figure 3E:
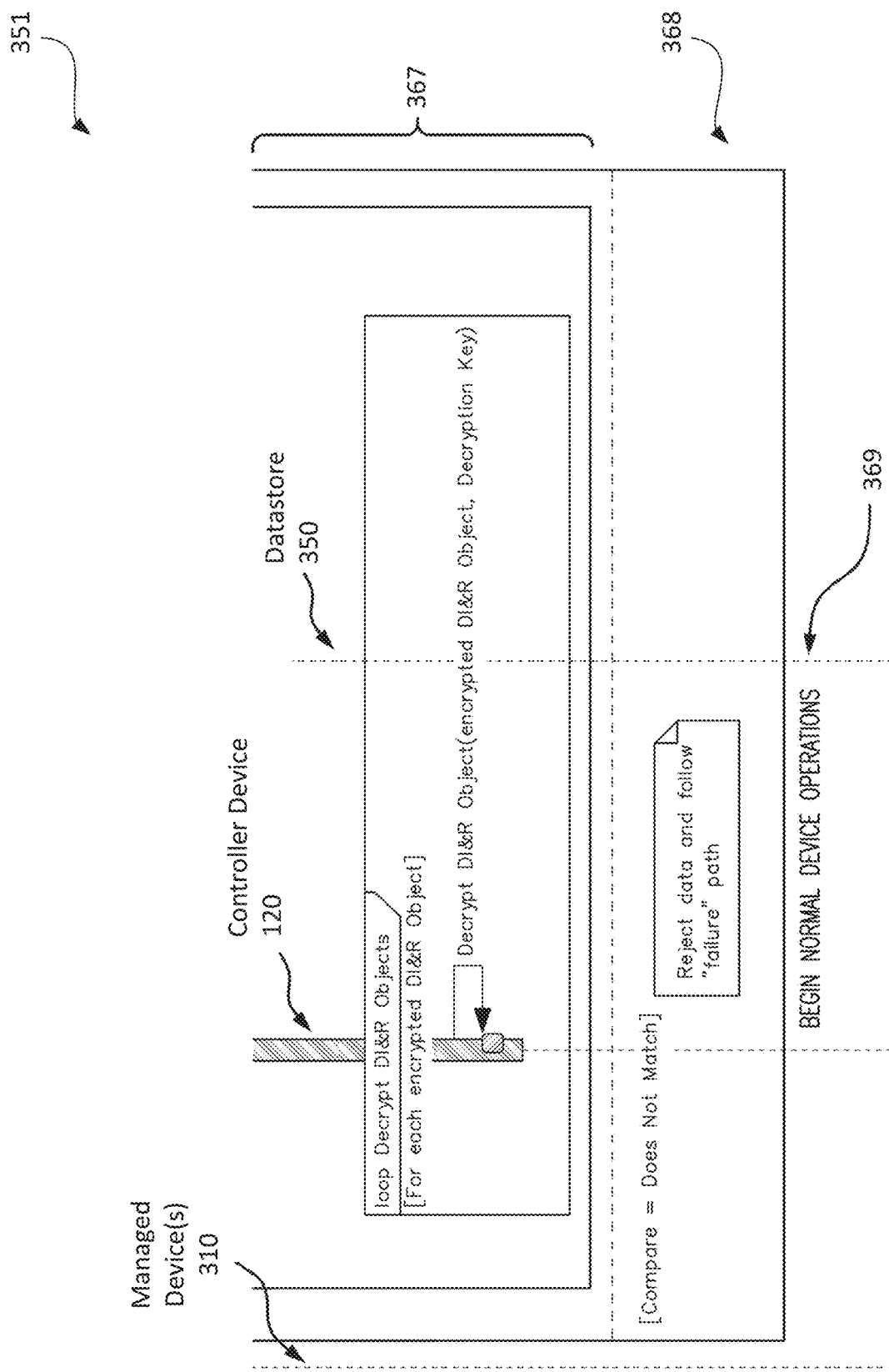

Turning to FIG. 3D, if the compared hash values do not match the background triggering process 351 can jump to step 368 where the "failure" path can include a rejection of the encrypted sensitive device data and an error code is generated. Otherwise, if the compared hash values match, the background triggering process 351 continue sat step 367 where it is determined that the encrypted sensitive device data is valid and the configuration of the replacement device can continue. The sensitive device data is decrypted by using the encryption/decryption key and then loaded into the configuration of a replacement device. Thereupon, the replacement device can resume normal operations in substitution for the original device in the network.

Figure 4:
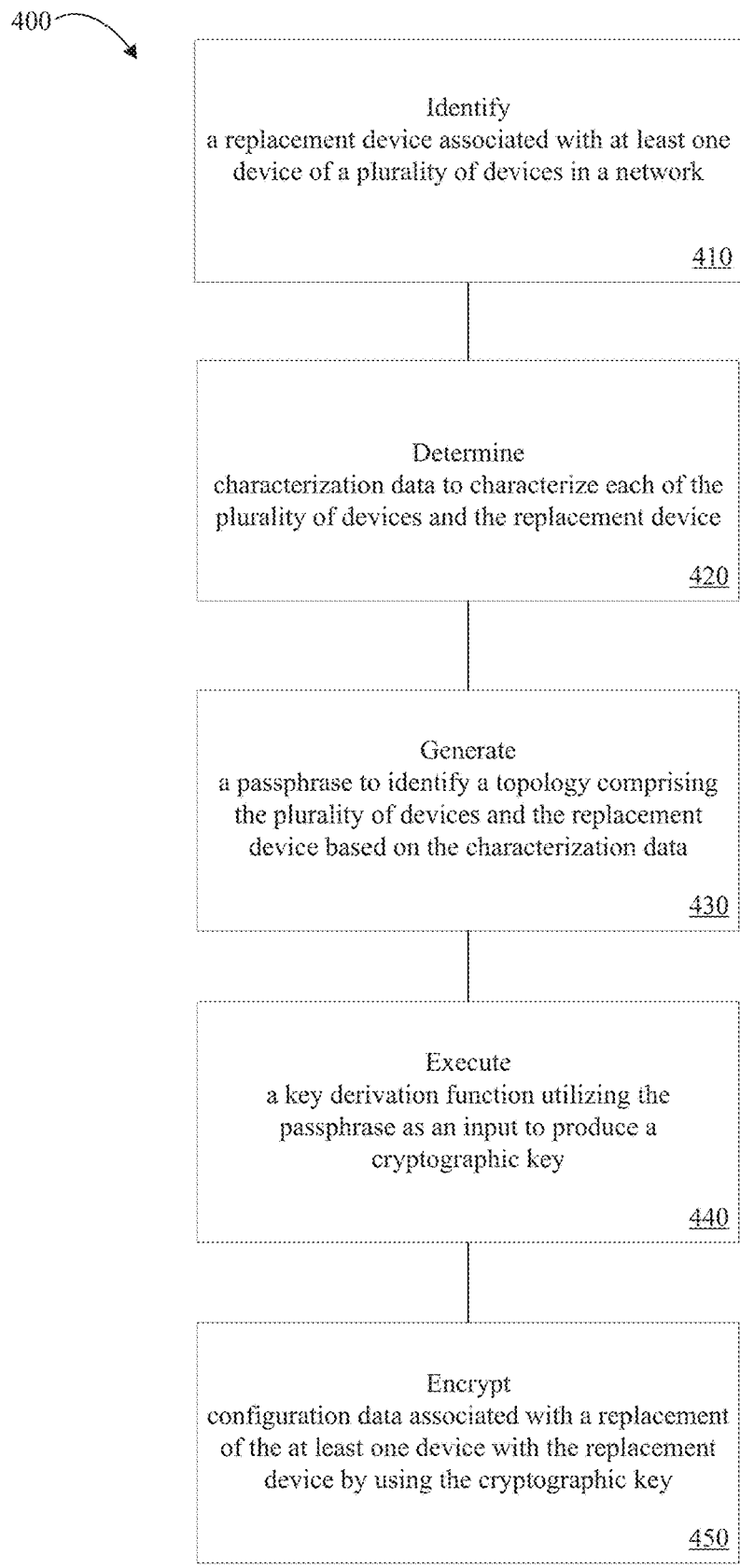
FIG. 4 is a flow diagram of a method of providing device data protection based on network topology in fast device replacement of a managed device according to an embodiment of the disclosure.

FIG. 4 is a flow diagram of a method 400 according to an embodiment of the disclosure. In one embodiment, the controller device 120 of FIGS. 1A-C can perform method 400 to provide device data protection based on network topology in fast device replacement of a managed device. The method 400 can be performed by processing logic (e.g., DI&R logic 125) of the controller device 120. The processing logic can comprise hardware (circuitry, dedicated logic, etc.), software (such as is run on a general-purpose computer system or a dedicated machine), or a combination of both. Alternatively, in some other embodiments, one or more processors of the controller device 120 executing the method can perform routines, subroutines, or operations can perform method 400 and each of its individual functions. In certain embodiments, a single processing thread can perform method 400. Alternatively, two or more processing threads with each thread executing one or more individual functions, routines, subroutines, or operations can perform method 400. It should be noted that blocks of method 400 depicted in FIG. 4 can be performed simultaneously or in a different order than that depicted.

Referring to FIG. 4, at block 410, method 400 identifies a replacement device associated with at least one device of a plurality of devices in a network. For example, controller device can identify a replacement device to configure as a replacement for an original device in the network based on a detected event, such as a configuration change event, an operator command event, an error notification event, a reboot event, a scheduling event, etc. In block 420, characterization data to characterize each of the plurality of devices and the replacement device is determined. For example, the controller device query all the managed devices and receive in response the device characterization data that can include, but not limited to, a device serial number, a device commercial reference number, device location information, device order sequencing information, etc.

A passphrase related to a topology comprising the plurality of devices and the replacement device is generated in block 430 based on the characterization data. For example, the passphrase can be a concatenation of the device characterization data that is organized in a certain arrangement with respect to the topology. A key derivation function utilizing the passphrase as an input is executed in block 440 to produce a cryptographic key. For example, the passphrase is used as input data to the key derivation function that returns the cryptographic key as output. Using the cryptographic key, configuration data associated with a replacement of the at least one device with the replacement device is encrypted in block 450. For example, the sensitive device data is encrypted based on an encryption/decryption key portion of the cryptographic key.

Figure 5:
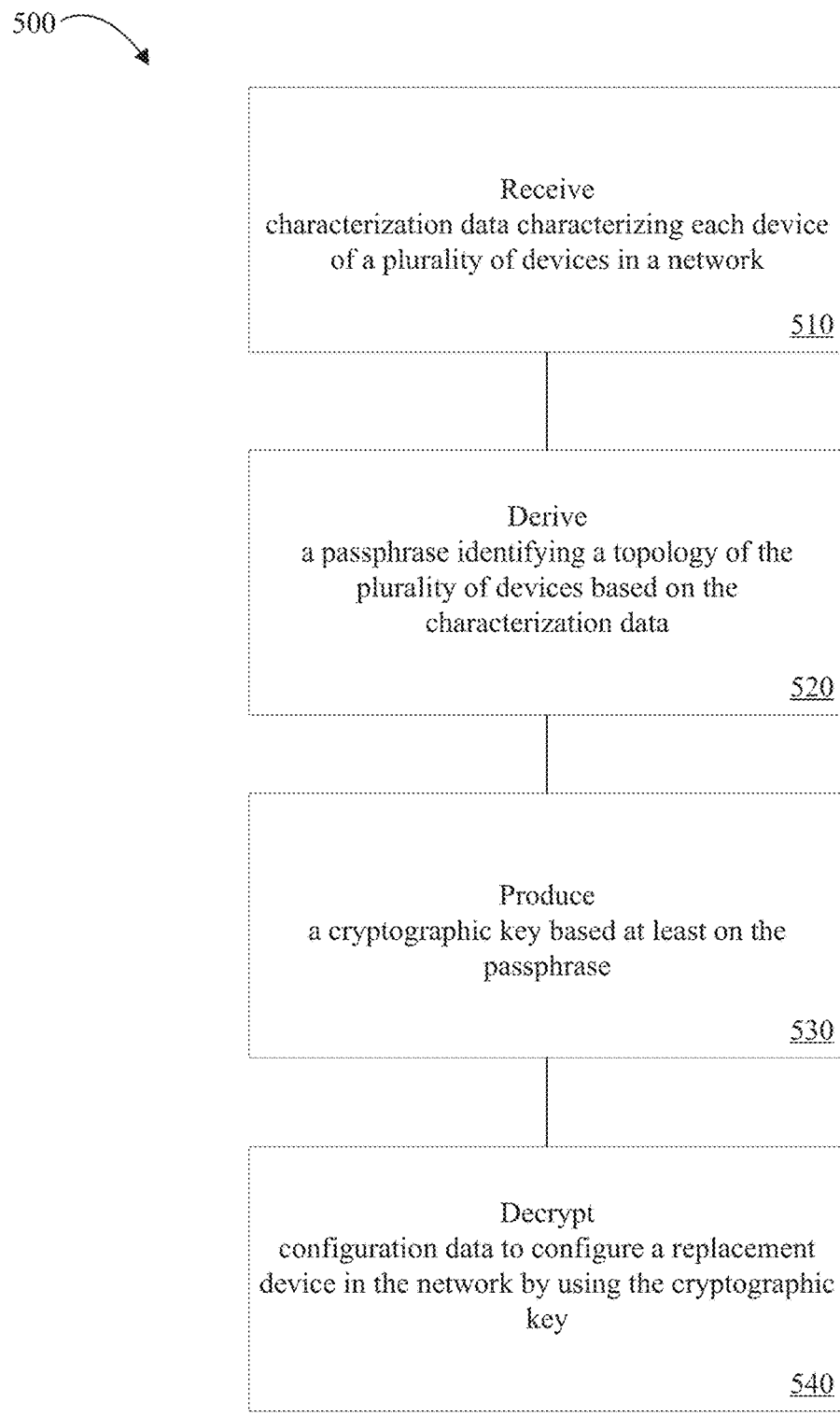
FIG. 5 is a flow diagram of a method of providing device data protection based on network topology in fast device replacement of a controller device according to an embodiment of the disclosure.

FIG. 5 is a flow diagram of a method 500 according to an embodiment of the disclosure. In one embodiment, the controller device 120 of FIGS. 1A-C can perform method 500 to provide device data protection based on network topology in fast device replacement of a controller device. The method 500 can be performed by processing logic (e.g., DI&R logic 125) of the controller device 120. The processing logic can comprise hardware (circuitry, dedicated logic, etc.), software (such as is run on a general-purpose computer system or a dedicated machine), or a combination of both. Alternatively, in some other embodiments, one or more processors of the controller device 120 executing the method can perform routines, subroutines, or operations can perform method 500 and each of its individual functions. In certain embodiments, a single processing thread can perform method 500. Alternatively, two or more processing threads with each thread executing one or more individual functions, routines, subroutines, or operations can perform method 500. It should be noted that blocks of method 500 depicted in FIG. 5 can be performed simultaneously or in a different order than that depicted.

Referring to FIG. 5, at block 510, method 500 receives characterization data characterizing each device of a plurality of devices in a network. For example, the controller device can receive device characterization data that can include, but not limited to, a device serial number, a device commercial reference number, device location information, device order sequencing information, etc. A passphrase related to a topology of the plurality of devices is derived in block 520 based on the characterization data. For example, the passphrase can be a concatenation of the device characterization data that is organized in a certain arrangement with respect to the topology. A cryptographic key is produced in block 530 based at least on the passphrase. For example, passphrase is used as input data to a key derivation function that returns the cryptographic key as output. Using the cryptographic key, configuration data to configure a replacement device in the network is decrypted in block 540. For example, the sensitive device data is decrypted based on an encryption/decryption key portion of the cryptographic key.

FIG. 6 is a block diagram illustrating a system 600 including one or more machines 610, 620 and 630 within which a set of instructions, for causing the machines to perform any one or more of the methodologies discussed herein, can be executed. In alternative embodiments, the system 600 can be connected (e.g., networked) to other machines in a LAN, an intranet, an extranet, or the Internet. The machines 610, 620 and 630 can be compared to the devices of FIGS. 1A-C. For example, machine 610 can be same as one of the managed devices 110a-n, machine 620 can be the same as controller device 120 and machine 630 can be the same as server 103 of FIGS. 1A-C.

In certain embodiments, the machines 610, 620 and 630 of system 600 can be connected via a network 601 (such as a Local Area Network (LAN), an intranet, an extranet, or the Internet) to other computer systems. The computer systems can operate in the capacity of a server or a client computer in a client-server environment, or as a peer computer in a peer-to-peer or distributed network environment. For example, the computer systems can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting microservices of a blockchain consensus system.

System 600 includes a processing device (e.g., CPU 612, 622, 632), a volatile memory 614, 624, 634, such as a flash, random access memory (RAM), dynamic random-access memory (DRAM, (such as synchronous DRAM (SDRAM)

or DRAM (RDRAM), etc.), static random-access memory (SRAM), a non-volatile memory 616, 626, 636 (e.g., read-only memory (ROM) or an electrically-erasable programmable ROM (EEPROM)), one or more input/output devices 618, 628, 638, a data storage device 621 and a network interface 619, 629, 639 to communicate via a network 601.

Processing devices 612, 622, 632 represent one or more general-purpose processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing devices 612, 622, 632 can execute processing logic (e.g., DI&R logic 125) for performing the operations and steps discussed herein.

The system 600 can further include a network interface device (e.g., network interface 619, 629, 639) communicably coupled to a network 601. The computer system 500 also can include one or more input/output devices 618, 628, 638 that include, but not limited to, a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device 621 can include a computer-readable storage medium 623 (e.g., a non-transitory computer-readable storage medium) on which can store instructions encoding any one or more of the methods or functions described herein, including instructions encoding the DI&R logic of FIGS. 1A-C for implementing method 400 of FIG. 4 for supporting micro-services of a blockchain consensus system. Instructions can also reside, completely or partially, within volatile memory 614 and/or within processing device 612 during execution thereof by system 600, hence, volatile memory 614 and processing device 612 can also constitute machine-readable storage media.

The non-transitory machine-readable storage medium 623 can also be used to store instructions to implement DI&R logic 125 to provide device data protection based on network topology to ensure confidentiality and integrity protection for sensitive device (configuration) data in the fast device installation and replacement service described herein, and/or a software library containing methods that call the above applications. While the machine-accessible storage medium 623 is shown in an example embodiment to be a single medium, the term "machine-accessible storage medium" should be taken to include a single medium or multiple medium (e.g., a centralized or distributed database, and/or associated caches and servers) that store the one or more sets of instructions. The term "machine-accessible storage medium" shall also be taken to include any medium that can store, encode or carry a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the preceding, reference is made to various embodiments. However, the scope of the disclosure is not limited to the specific described embodiments. Instead, any combination of the described features and elements, whether related to different embodiments or not, is contemplated to implement and practice contemplated embodiments. Furthermore, although embodiments can achieve advantages over other possible solutions or over the prior art, whether or not a particular advantage is achieved by a given embodiment is not limiting of the scope of the disclosure. Thus, the preceding aspects, features, embodiments and advantages are merely illustrative and are not considered elements or limitations of the appended claims except where explicitly recited in a claim(s).

The various embodiments disclosed herein can be implemented as a system, method or computer program product. Accordingly, aspects can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects can take the form of a computer program product embodied in one or more computer-readable medium(s) having computer-readable program code embodied thereon.

Any combination of one or more computer-readable medium(s) can be utilized. The computer-readable medium can be a non-transitory computer-readable medium. A non-transitory computer-readable medium can be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions can be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible embodiments of various embodiments of the disclosure. In this regard, each block in the flowchart or block diagrams can represent a module, segment or portion of code, which comprises one or more executable instructions for implementing the specified logical function(s). It should also be noted that, in some alternative embodiments, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other embodiment examples are apparent upon reading and understanding the above description. Although the disclosure describes specific examples, it is recognized that the systems and methods of the disclosure are not limited to the examples described herein, but can be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A controller device for device data protection based on network topology, comprising:
   a memory to store a plurality of configuration data; and a processing logic, operatively coupled to the memory, to:
   identify a replacement device associated with at least one device of a plurality of devices in a network;
   determine characterization data to characterize each of the plurality of devices and the replacement device;
   determine a topology comprising the plurality of devices and the replacement device;
   generate a passphrase by concatenating the characterization data for each device within the determined topology in a predefined arrangement;
   execute a key derivation function utilizing the passphrase as an input to produce a cryptographic key that can be divided into two keys comprising an encryption key and a hash key; and
   encrypt, using the produced encryption key, configuration data associated with a replacement of the at least one device with the replacement device and hash the configuration data with the produced hash key to assure the configuration data is not tampered with after being encrypted.

2. The controller device of claim 1, wherein the processing logic is further to:
   query each of the plurality of devices for the characterization data; and
   responsive to the query, receive a unique identifier for each of the plurality of devices and a sequence order of the plurality of devices.

3. The controller device of claim 2, wherein the predefined arrangement is based on an order of each device of the plurality of devices with respect to the topology.

4. The controller device of claim 1, wherein the processing logic is further to:
configure the replacement device to operate as the replacement of the at least one device based on the configuration data.

5. The controller device of claim 4, wherein the processing logic is further to:
   detect an event associated with the replacement, wherein the event comprises at least one of: a configuration change event, an operator command event, an error notification event, a reboot event or a scheduling event.

6. A method for device data protection based on network topology, comprising:
   receiving characterization data characterizing each device of a plurality of devices in a network;
   deriving, by a controller device, a passphrase related to a topology of the plurality of devices based on the characterization data, comprising:
   determining the topology comprising the plurality of devices and a replacement device; and
   generating the passphrase by concatenating the characterization data for each device within the determined topology in a predefined arrangement;
   producing, by the controller device, a cryptographic key based at least on the passphrase that can be divided into two keys comprising an decryption key and a hash key; and
   decrypting, using the produced decryption key, configuration data to configure the replacement device in the network and validating the configuration data with the produced hash key to assure the configuration data is not tampered with after being encrypted.

7. The method of claim 6, further comprising:
   configuring the replacement device to operate as a replacement of the controller device based on the configuration data.

8. The method of claim 7, further comprising:
   detecting an event associated with the replacement, wherein the event comprises at least one of: a configuration change event, an operator command event, an error notification event, a reboot event or a scheduling event.

9. The method of claim 6, wherein the predefined arrangement is based on an order of each device of the plurality of devices with respect to the topology.

10. The method of claim 6, further comprising:
    validating decrypted configuration data for the replacement device based on a computed hash value associated with the plurality of devices.

11. The method of claim 10, wherein validating further comprises:
    comparing the computed hash value with a hash value extracted from the decrypted configuration data.

12. A non-transitory computer-readable storage medium comprising executable instructions for device data protection based on network topology that when executed, by a controller device, cause the controller device to:
    receive characterization data characterizing each device of a plurality of devices in a network;
    determine, by the controller device, a topology of the plurality of devices;
    generate, by the controller device, a passphrase by concatenating the characterization data for each device within the determined topology in a predefined arrangement;
    produce a cryptographic key based at least on the passphrase that can be divided into two keys comprising an decryption key and a hash key; and decrypting, using the produced decryption key, configuration data to configure the replacement device in the network and validating the configuration data with the produced hash key to assure the configuration data is not tampered with alter being encrypted.

13. The non-transitory computer-readable storage medium of claim 12, wherein the controller device is further to:
configure the replacement device to operate as a replacement of the controller device based on the configuration data.

14. The non-transitory computer-readable storage medium of claim 13, wherein the controller device is further to:
detect an event associated with the replacement, wherein the event comprises at least one of: a configuration change event, an operator command event, an error notification event, a reboot event or a scheduling event.

15. The non-transitory computer-readable storage medium of claim 12, wherein the predefined arrangement is based on an order of each device of the plurality of devices with respect to the topology.

16. The non-transitory computer-readable storage medium of claim 12, wherein the controller device is further to:
validate decrypted configuration data for the replacement device based on a computed hash value associated with the plurality of devices.

17. The non-transitory computer-readable storage medium of claim 16, wherein to validate, the controller device is further to:
compare the computed hash value with a hash value extracted from the decrypted configuration data.

* * * * *